May 17, 1966 J. F. L. PALMER 3,252,088

APPARATUS FOR IDENTIFYING CONDUCTOR PAIRS IN A MULTIPAIR TELEPHONE CABLE

Filed Dec. 20, 1961 4 Sheets-Sheet 1

INVENTOR
J. F. L. PALMER
BY
Patrick J. Roche
ATTORNEY

May 17, 1966 J. F. L. PALMER 3,252,088

APPARATUS FOR IDENTIFYING CONDUCTOR PAIRS IN A MULTIPAIR TELEPHONE CABLE

Filed Dec. 20, 1961 4 Sheets-Sheet 2

CENTRAL OFFICE SET

INVENTOR
J. F. L. PALMER
BY
Patrick J. Roche
ATTORNEY

FIELD SET

INVENTOR
J. F. L. PALMER
BY
Patrick J. Roche
ATTORNEY

May 17, 1966 J. F. L. PALMER 3,252,088

APPARATUS FOR IDENTIFYING CONDUCTOR PAIRS IN A MULTIPAIR TELEPHONE CABLE

Filed Dec. 20, 1961 4 Sheets-Sheet 4

INVENTOR
J. F. L. PALMER
BY Patrick J. Roche
ATTORNEY 3,252,088

APPARATUS FOR IDENTIFYING CONDUCTOR PAIRS IN A MULTIPAIR TELEPHONE CABLE

J. F. Lewis Palmer, El Cajon, Calif., assignor to American Telephone and Telegraph Company, New York, N.Y., a corporation of New York Filed Dec. 20, 1961, Ser. No. 160,785
28 Claims. (Cl. 324—66)

Figure 1:
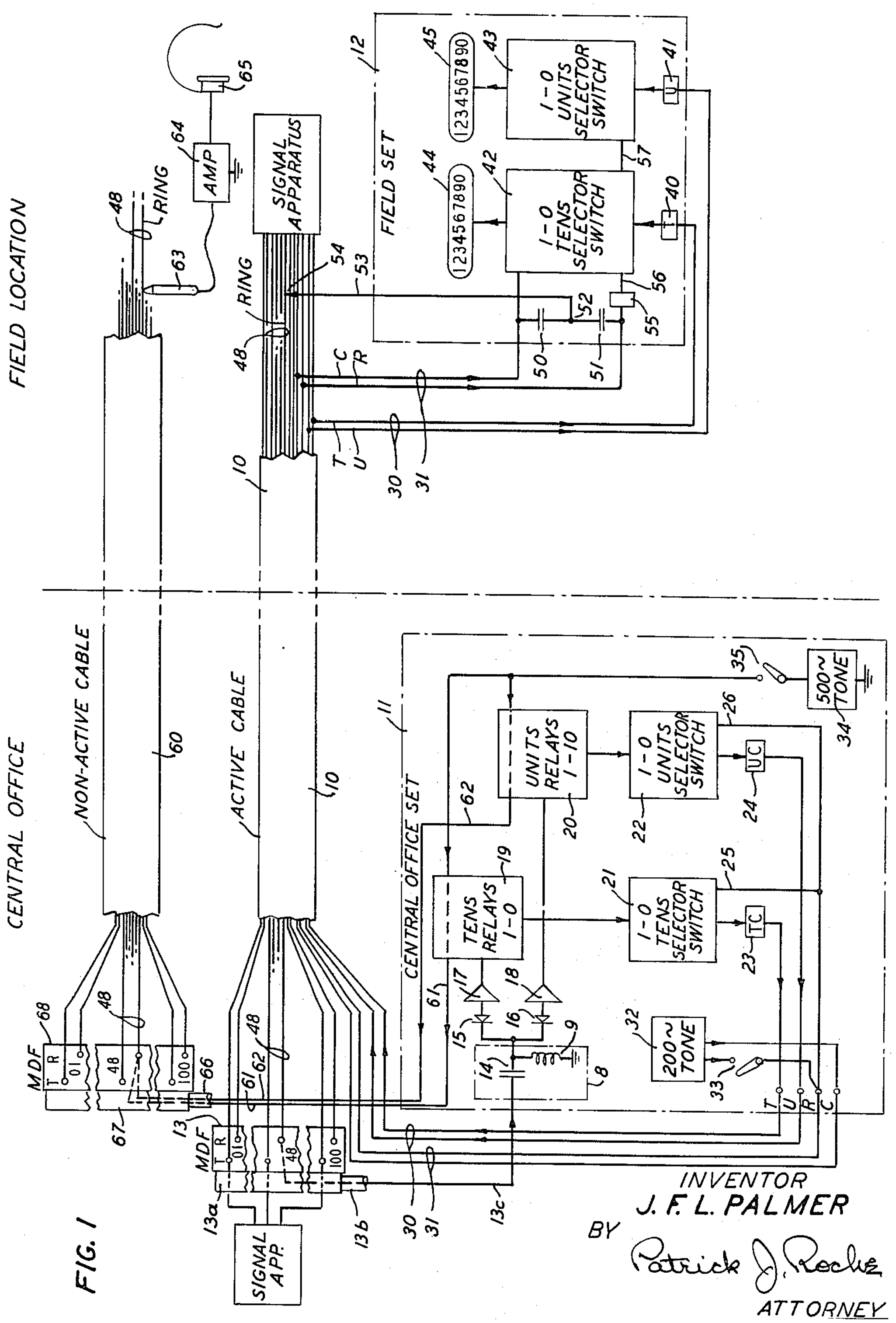

This invention relates to apparatus for numerically identifying individual pairs in a multipair telephone cable, and more specifically to apparatus for visually displaying multidigital numerical identifications of the individual conductor pairs at the end of such cable far from the near end at which the same pairs are theretofore numerically identified with corresponding discrete multidigital numbers in such manner that the same discrete multidigital numbers identify the near and far ends of the individual conductor pairs. This invention contemplates such multidigital identification of individual pairs in a multipair telephone cable which is actively transmitting telephone signals, subject to "busy" monitoring of discrete conductor pairs before proceeding with the numerical identification thereof, as well as the multidigital identification of the pairs in a nonactive cable which is to be substituted ultimately for the active cable.

Cables comprising a plurality of twisted pairs, each including a tip and ring conductor, enclosed in a suitable sheath are well known in telephony communication. These cables may constitute individual links between a telephone central office and a plurality of telephone subscribers positioned remotely therefrom in the same geographical area. Also, the cables may be spliced in tandem to constitute a continuously long cable in which the twisted pairs of one cable are joined to the twisted pairs of each succeeding cable section. In either event, it is imperative that the discrete conductor pairs at the opposite ends of the cable be connected to previously assigned equipments located thereat. To achieve this, it is necessary to employ suitable testing apparatus to ensure that each twisted pair is properly identified at the opposite cable ends.

In one identification system of the above type known heretofore, an alternating-current signaling tone was applied successively to a plurality of individual conductor pairs on a basis of one-pair-at-a-time at the sending end, and the signaling tone picked up with the aid of a suitable probe and amplifier at one or more intermediate points and/or at the receiving end. Normally, this procedure involves the use of two technicians, one at the sending end to transfer the signaling tone successively from one conductor to another, and a second one at the intermediate point or conductor end to manipulate the testing equipment. A system of this type is disclosed in Fisher-Parker Patent No. 2,133,384 issued October 18, 1938.

In another known identification system, the use of an alternating-current signaling tone permits a one-man testing operation. This involves the use of an automatic selecting device operated by a technician located at a remote point for actuating a switching mechanism at a telephone central office to place the alternating-current signaling tone on the sending end of one preselected conductor pair at the central office at a given time. This system also permits the use of a pick-up probe and amplifier by the technician at the testing location on the conductor. Although this system involves essentially a one-man operation, it further involves the use of equipment which is relatively expensive, heavy and bulky, intended basically for use with switching mechanisms located permanently in a telephone central office and tending to manifest mechanical difficulties from time to time thereby requiring maintenance; and it requires the use of technicians having at least a certain skill in the telephony art. Such testing equipment is disclosed in Lowman et al. Patent No. 2,799,739 issued July 16, 1957, and Meanley Patent No. 2,806,995 issued September 17, 1957.

In the apparatus heretofore used for cable pair identification, it was found that the techician was called upon to perform a multiplicity of functions to obtain the desired identification, and this tended to cause errors which were mostly due to human failure such, for example, as fatigue, in a hurry, pressing to get the job done, limited time, poor health and the like.

The present invention contemplates apparatus for visually displaying discrete multidigital numbers identifying individual pairs at the end of a multipair telephone cable far from the end thereof at which the same pairs were therefore numerically identified with corresponding discrete multidigital numbers.

The principal object of the present invention is to provide a visual display of the discrete multidigital numbers identifying the remote ends of individual pairs constituting a multipair telephone cable.

Another object is to provide facile equipment for expeditiously and visually displaying discrete multidigital numbers at the remote ends of telephone pairs for effecting the numerical identification thereof, in accordance with the discrete multidigital numbers identifying the same pairs at the near ends thereof.

A further object is to reduce substantially the number of errors tending to occur in the operation of numerically identifying the individual pairs in a multipair telephone cable, particularly those arising from the functions of a telephone technician.

Still another object is to reduce to a singly manual operation on the part of a technician for achieving the numerical identification of the remote end of each pair included in a multipair telephone cable.

Still a further object is to identify in a visual manner the remote ends of individual pairs included in a multipair telephone cable with discrete multidigital numbers, subject to "busy" monitoring of such pairs that may be transmitting voice signals at the time.

Still another object is to identify with visually-indicated discrete multidigital numbers the remote ends of the conductor pairs in a signal transmitting telephone cable with discrete multidigital numbers identifying the near ends of the same pairs of such cable and to use such identification in conjunction with a preselected tone for identifying the far ends of the individual pairs in another cable with the same or related discrete multidigital numbers.

Figure 2:
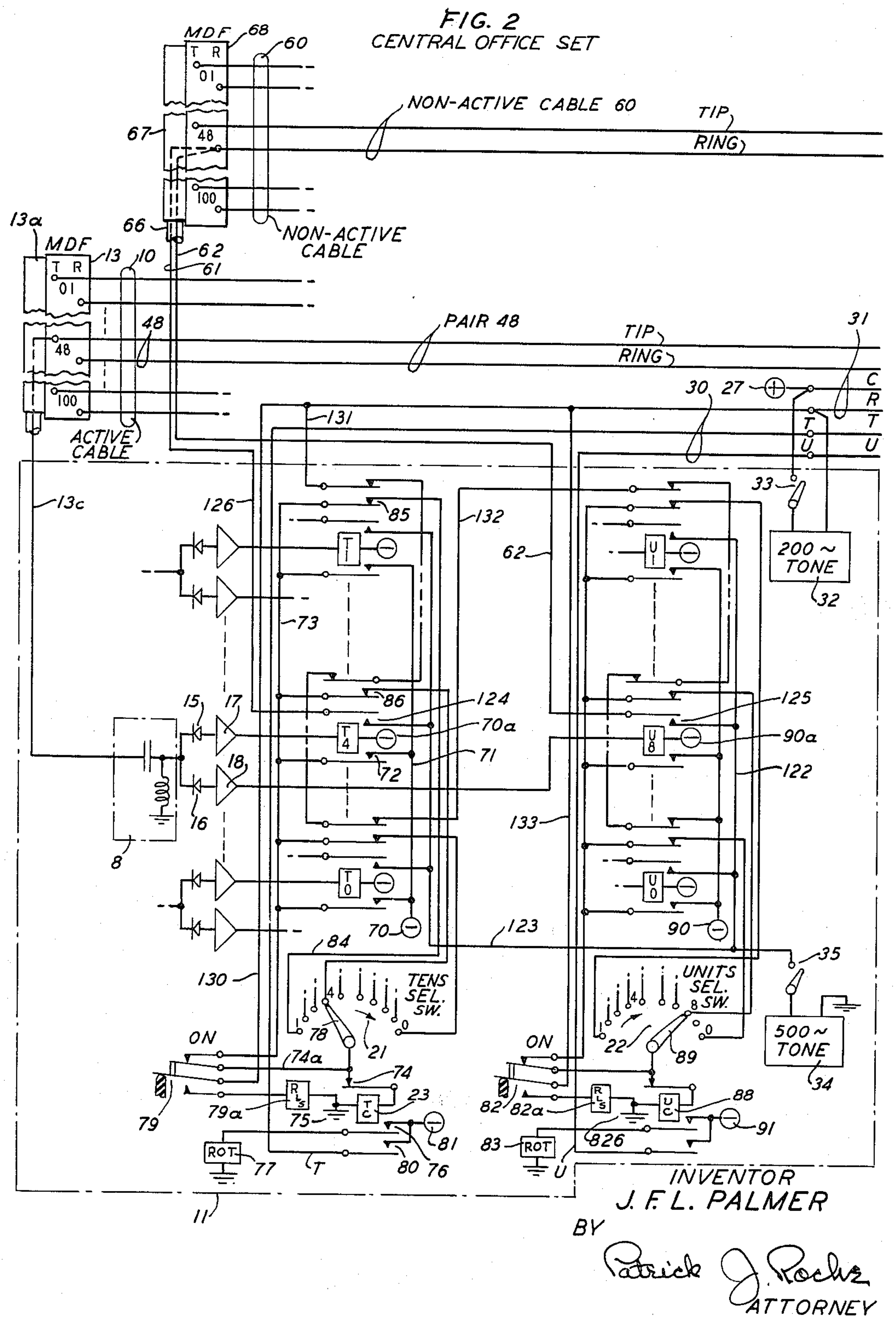
Figure 3:
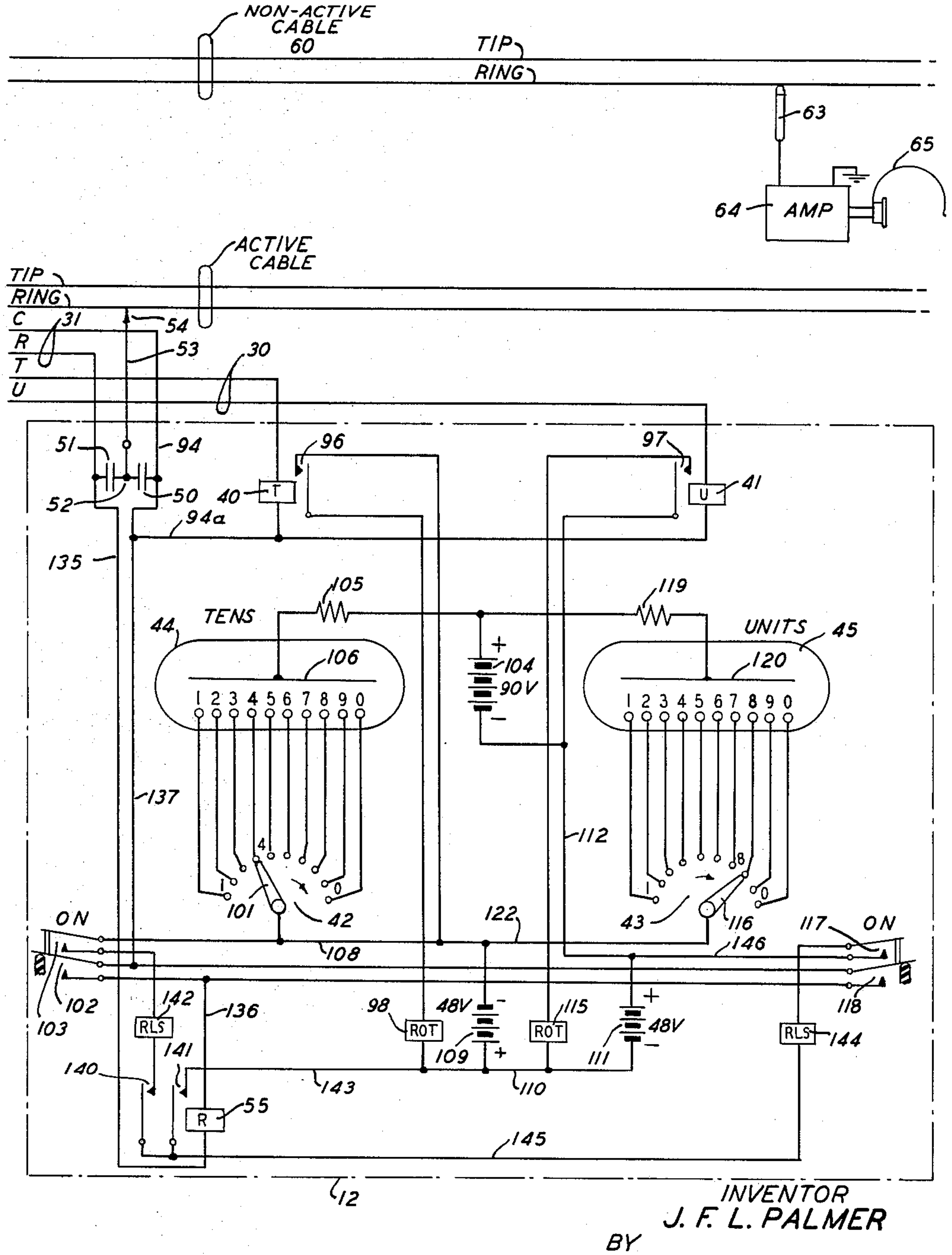
Figure 4:
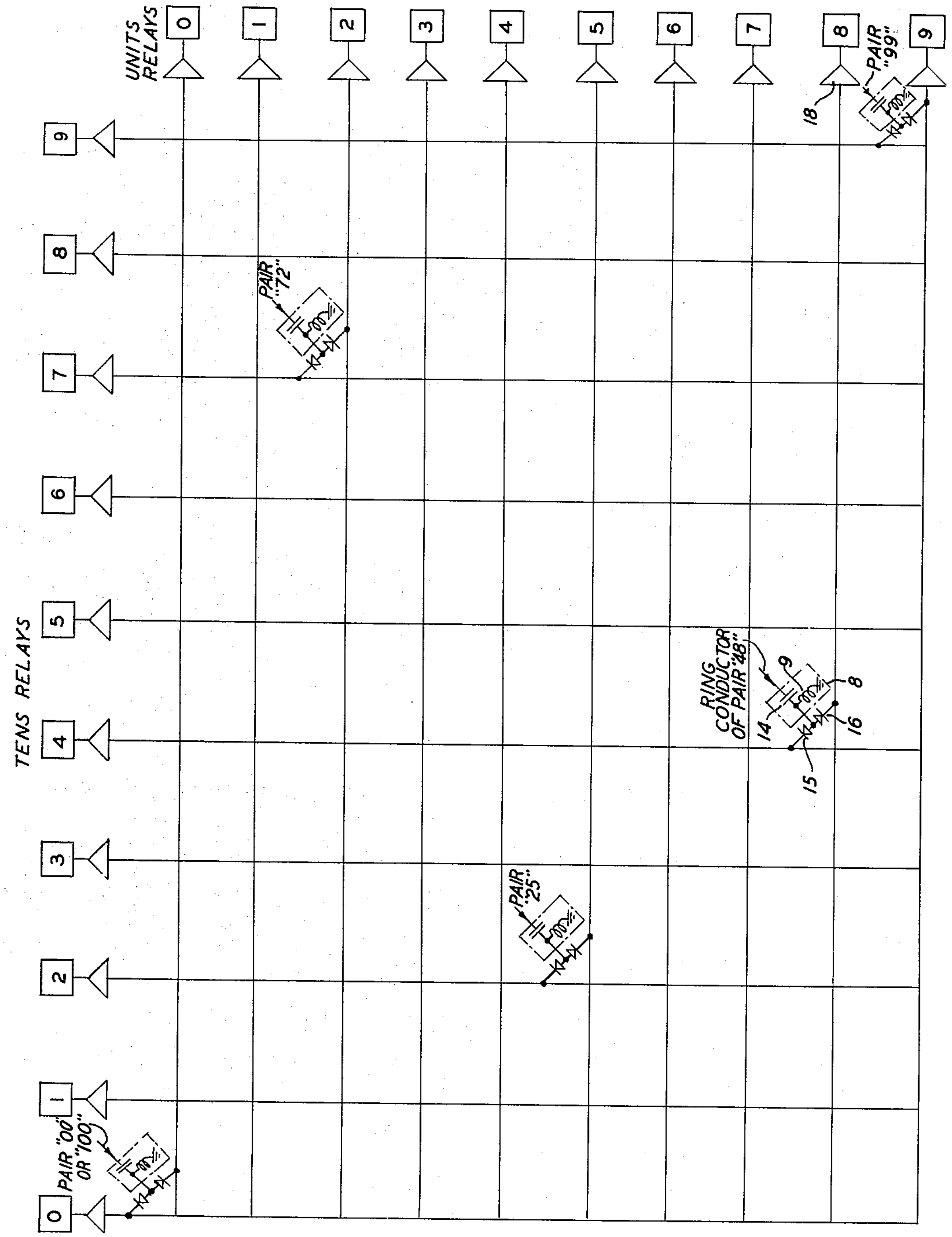

The invention will be readily understood from the following description when taken together with the accompanying drawing in which:

FIG. 1 is a block diagram of a specific embodiment of the invention;

FIGS. 2 and 3 are schematic diagrams illustrating certain circuit details involved in FIG. 1; and FIG. 4 is essentially a chart showing a certain circuit connection for the ring conductor of each 100-pair group in the multipair cables shown in FIGS. 1 and 2.

In association with a multipair telephone cable in which the near or central office ends of the respective conductor pairs are numerically identified with discrete multidigital numbers and in which each pair includes a ring conductor, a specific embodiment of the present invention for numerically identifying the far or field ends of the same pairs with multidigital numbers identical with the near-end multidigital numbers comprises at the near cable end means for applying a signal tone of preselected frequency to the far end of the ring conductor of each pair selected at random one at a time, unidirectional means for dividing the signal tone at the near end of the ring conductor into two components, amplifying means for each component, individual relays formed in tens and units groups of 0 through 9 whereby a particular one relay of each group is operated in response to one of the components for representing the multidigital number identifying the near end of each such pair selected at random, and tens and units pulsing means automatically stepped and terminated in response to the operation of the particular tens and units relays whereby the pulsing means are caused to transmit predetermined quantities of tens and units pulses on a spare conductor pair from the near end of the randomly selected conductor to the far end thereof for representing thereat the last-mentioned multidigital number identifying the near end of each of the randomly selected pairs.

At the far cable end, tens and units control relays following the tens and units pulses received on the spare pair at the far end of the randomly selected pair step tens and units selector switches, each having 1 through 0 terminals, until particular terminals corresponding to the quantities of the received tens and units pulses are reached on the respective switches for representing thereon the multidigital number identifying the near end of each of the randomly selected pairs whereupon the stepping of the selector switches is terminated, and tens and units visual display devices, each including discrete 1 through 0 digits, whereby one digit of each device is energized in response to one of the particular switch terminals at which the selector switch stepping terminated. The energized tens and units digits together serve to display visually another multidigital number whose tens and units digits correspond with the tens and units digits of the multidigital number identifying the randomly selected pair at the near cable thereby visually displaying a multidigital number identifying the radomly selected pair at the far cable end. This display remains operated until the preselected tone is removed from the randomly selected pair whereupon the overall circuit is restored to normal in preparation for the similar identification of another cable pair selected at random at the far cable end.

Assuming, for example, that the 48-pair was initially selected at random at the far cable end, but then not so known, the preselected tone would actually be received on the ring conductor of the 48-pair at the near cable end. This tone would then be divided into two components which would be amplified and thereafter used to operate the 4 relay of the tens-relay group and the 8 relay of the units-relay group. In response to operation of such particular 4 and 8 relays, the tens and units pulsing means at the near cable end would transmit on the spare conductor pair to the far cable end 4 tens-pulses and 8 units-pulses for representing thereat the 48 multidigital number identifying the near end of the randomly selected pair.

At the far cable end the tens and units control relays will follow the 4 tens and 8 units-pulses to step the tens and units selector switches until the particular 4 tens-terminal and the 8 units-terminal of the respective selector switches are reached whereupon the stepping of these switches would be terminated. These particular terminals would then serve to energize the 4 and 8 digits of the tens and units display devices, respectively, with appropriate voltages thereby visually displaying another multidigital number whose 4 tens-digit and 8 units-digit correspond with the 4 tens-digit and 8 units-digit of the 48 multidigital number identifying the randomly selected pair at the near cable end. The 48 multidigital number displayed at the far cable end to identify the pair randomly selected thereat is thus the same as the 48 multidigital number identifying the same pair at the near end thereof. This display is continued until the preselected tone is removed from the randomly selected pair whereupon the overall circuit will be returned to normal.

A modification is provided for numerically identifying the respective pairs in a second multipair cable, which is not then transmitting signals but is contemplated as a substitute for the first-mentioned cable, at ends far from near ends at which the last-mentioned respective pairs are also numerically identified with the same or related multidigital numbers identifying the corresponding pairs at the near ends of the first-mentioned cable which may be at that time adapted for voice transmission. The modification comprises a second means for producing a signal tone having a frequency different from that of the first-mentioned preselected tone. The second tone is applied via the particular operated tens and units relays to the near end of the ring conductor of the second cable pair corresponding with the ring conductor of the randomly selected pair of the first-mentioned cable. At the far end of such corresponding cable pair, a detector deriving the second tone from the ring conductor thereof serves to isolate the last-mentioned pair in an audible manner. This pair is numerically identified at the far end thereof with a multidigital number which is identical with or related to the multidigital number then being visually displayed at the far end of the randomly selected pair of the first-mentioned cable.

A feature of the invention involves the use of a plurality of filter networks each of which is connected to a point common to one ring conductor and associated dividing means of the respective pairs for transmitting the first-mentioned preselected tone but blocking the transmission of all other tones having frequencies different from that of the preselected tone.

Another feature relates to the use of visual-display devices for visually displaying the discrete multidigital numbers on a permanent basis thereby enabling the telephone technician to check and recheck such visual multidigital displays, until the first-mentioned tone is removed from each randomly selected pair to return the overall testing apparatus including the visual display devices to normal.

A further feature, once the far and near end equipments are properly located and supplied with electrical power, concerns the telephone technician's single function of applying the first-mentioned preselected tone to the far end of the ring conductor of each randomly selected pair, one at a time, after which the testing circuit operates automatically to provide the visual display of the multidigital number for identifying such pair at the far end, thereby permitting the telephone technician to be free to walk about and perform such activities as may require his personal attention at that time, another pair is selected at random for numerical identification.

Still another feature includes the use of so-called dry-cell batteries for energizing both the central office and field components of the overall testing equipment, thereby obviating the necessity of using commercial electrical power. This power may be used, when desired, in the interest of minimizing the weight and bulk of the respective components.

A still further feature involves the simplicity of design and operation of the testing equipment thereby enabling an expeditious use thereof with a minimum time allotted to the technician for instruction and/or explanation.

Still another feature concerns the relatively small bulk and weight of the equipments whereby they tend to lend themselves for expeditious transport and mobility.

Referring to FIG. 1, a multipair telephone cable 10 extending between a telephone central office and a field location terminates at both thereof in telephone signalling apparatus suitable for enabling voice communication therebetween in the well-known manner. It will be understood that the individual pairs of the cable comprise twisted pairs each of which includes at least tip and ring conductors of which the ring conductor is readily identifiable by distinctive insulation coloring or code markings in the manner familiar to the art. The cable may comprise one section having a length of the order of several hundred feet or two or more sections each having a length comparable with the single section, more or less.

In the central office the individual pairs terminate usually on a main distributing frame MDF having say, for example, 100 pairs of associated tip and ring terminals numerically identified in the range from 01 through 100 in accordance with the usual telephone practice. The respective pairs are thus numerically identified at the near or central office ends with discrete multidigital numbers in the range from 01 through 100. In this connection, it will be understood that the 100-pair is actually the 00-pair. The signaling apparatus connectable to the respective pairs via the frame MDF thereat may comprise subscriber's sets or the like.

At the far or field location ends the respective pairs may terminate directly at individual subscriber's sets or the like. It will be understood that the signaling apparatus at the central office and field locations enables a preselection of the respective pairs of two-way voice transmission therebetween in the conventional manner in the art whereby the cable may then be considered to be active or working.

In accordance with the testing apparatus of the present invention, the respective pairs of the multipair cable 10 may be identified at the field location or far ends with discrete multidigital numbers identical with the multidigital numbers identifying the same pairs at the central office or near ends by the combined use of a central office set 11 and a field set 12 shown in FIG. 1, in a manner that will be presently explained. For the purpose of facilitating an expeditious understanding of the invention, the explanation hereinafter will assume that it is desired to identify numerically the field location or far end of pair 48 in cable 10 with a multidigital number which is identical with the 48 multidigital number identifying the same pair at the central office or near end thereof.

Referring now to the central office shown in FIG. 1, it will be seen that pair 48 of cable 10 has its tip and ring conductors connected to the T and R terminals 48 on section 13 of the central office MDF, and it will be understood therefrom that the tip and ring conductors of the remaining pairs 01 through 47 and 49 through 100 (00) of cable 10 terminate at corresponding T and R terminals on the same section of the central office MDF and are correspondingly identified thereon. A 100-pair connector shoe 13*a* attached to the tip and ring terminals of the 100-pair central office MDF section 13 includes a cable 13*b* comprising 100 pairs of twisted tip and ring conductors similar to those forming cable 10, and may be of type disclosed for example in Lowman et al. Patent No. 2,799,739 issued July 16, 1957. It will be thus apparent that each pair of cable 10 is connected to one pair of terminals on MDF section 13. As a consequence, conductor 13*c* of pair 48 in cable 13*b* connects the ring terminal of pair 48 at the central office MDF section 13 to the central office set 11 and therein through capacitor 14 to both cathodes of diode rectifiers 15 and 16 which are effectively connected through an inductor 9 to ground and whose anodes are connected to the inputs of amplifiers 17 and 18, respectively. This capacitor and inductor constitute a filter 8 whose function will be hereinafter explained. It will be understood that the connector shoe and associated cable, supra, may be adapted to accommodate 50 or 100 pairs.

As it will be further explained hereinafter regarding FIG. 2, the output of amplifier 17 is assumed to be connected to the operating winding of a 4 tens-relay included in the tens relay group 19 while the output of amplifier 18 is assumed to be connected to the operating winding of an 8 units-relay included in the units group 20, each of such tens and units relay groups comprising individual relays identified with a numeral in the range 1 through 0 as it will subsequently appear. From this it will be further assumed that the ring terminal of each pair identified on MDF section 13 in the range 01 through 100 is connected to the operating windings of corresponding relays in each of the tens and units relay groups. As shown in FIG. 4, the ring conductor of the 100 or 00 pairs will be connected via a lead similar to lead 13*c* to the operating windings of the 0 relays in the respective tens and units relay groups, the ring conductor of the 25-pair to the operating windings of the 2 tens-relay and the 5 units-relay, the ring conductor of the 72-pair to the operating windings of the 7 tens-relay and the 2 units-relay, and the ring conductor of the 99-pair to the operating windings of the 9 relays in the respective tens and units relay groups.

The respective relays in the tens and units relay groups have certain contacts, not shown, connectable to corresponding contacts, not shown, of tens and units selector switches 21 and 22, respectively, under control of tens and units control relays 23 and 24 whose contacts are intermittently connectable to the respective tens and units conductors T and U constituting a first spare conductor pair 30 in cable 10. The tens and units selector switches 21 and 22 are connected via respective leads 25 and 26 to a conductor R which, together with a conductor C, constitutes a second spare conductor pair 31 in cable 10. Both these spare conductor pairs are also available at the field end of the cable 10. A source 32 of a 200-c.p.s. alternating current tone, for example, is connectable via a normally opened single-pole single-throw switch 33 across the conductors R and C of spare pair 31; and a source 34 of a 500-c.p.s. alternating current tone, for example, is connectable through a normally opened single-pole single-throw switch 35 and certain contacts, not shown, of the tens and units relay groups 19 and 20, leads 61 and 62 included in 100-pair cable 66, and a 100-pair terminal shoe 67 attached to the tip and ring terminals of section 68 of the central office MDF. The cable 66 and shoe 67 are identical with the aforementioned cable 13*b* and shoe 13*a*, respectively. It will be obvious that the sources 32 and 34 may supply tones of other frequencies suitable for particular testing techniques.

At the field end of cable 10, spare pairs 30 and 31 are terminated in the field set 12. Spare pair 30 has its leads T and U connected via tens and units control relays 40 and 41 and tens and units selector switches 42 and 43 to gas-filled tubes 44 and 45, respectively. Each of these tubes includes a plurality of discrete digits in the range of 0 through 9, each of which digits will glow one at a time when an appropriate direct-current voltage is applied thereto under control of the contacts of selector switches 42 and 43 in a manner well understood in the art and mentioned later herein. Spare pair 31 including conductors C and R terminate capacitors 50 and 51 which are connected serially thereacross and have a common point 52 extended via lead 53 to a suitable wire clip 54. This clip may be detachably secured directly to the metallic surface of the far end of each ring conductor of the respective conductor pairs, one at a time, of cable 10, and is shown attached to the ring conductor of the 48-pair for the purpose of this explanation as hereinbefore assumed. A release relay 55 connected via leads 56 and 57 to the tens and units selector switches 42 and 43 is also connected via lead R of spare pair 31 at the far cable end to the central office set.

In the operation of the combined testing apparatus including the central office and field sets 11 and 12, respectively, for effecting the numerical identification of the field ends of the respective pairs of cable 10 with discrete multidigital numbers as aforesaid, it will be assumed that switch 33 is closed in the central office set to apply the 200-c.p.s. tone across the R and C conductors of spare pair 31, and further that wire clip 54 is secured to the metallic surface of the ring conductor of the 48-pair, as hereinbefore mentioned. For this connection, it will be understood, however, that the 48-pair as well as all other pairs at the far cable end are selected at random thereat for numerical identification. Now, the 200-c.p.s. tone is transmitted on spare pair 31 from the central office set to the field set and is applied thereat via series capacitors 50 and 51, common terminal 52, lead 53 and wire clip 54 to the ring conductor of the 48-pair. It will be understood that since cable 10 may be in active service, each pair randomly selected for identification is initially monitored for a "busy" condition, and if so found, it is passed over until a non-busy pair is found.

The 200-c.p.s. tone is thereafter transmitted on the ring conductor of the 48-pair from the field set to the 48-ring terminal on central office MDF section 13. From this 48-ring terminal, the tone is applied via ring terminal 48, shoe 13a and ring conductor 13c of conductor pair 48 included in cable 13b to rectifiers 15 and 16 in which it is divided into two components. At this point it will be understood that a filter network 8 serves to transmit therethrough the 200-c.p.s. tone with substantially minimum attenuation but to block effectively all alternating current signals whose frequencies differ therefrom.

The divided component from the output of rectifier 15 is applied via amplifier 17 to the operating winding of the 4 relay in the tens relay group while the divided component from the output of rectifier 16 is applied via amplifier 18 to the operating winding of 8 relay in the units relay group. These 4 and 8 relays, now operated, represent the 48 multidigital number identifying the 48-pair on the central office MDF section 13 as hereinbefore stated. When the respective 4 and 8 tens relays are operated, the tens and units selector switches 21 and 22 are both energized and step from their rest positions to the 4 contact of tens selector switch 21 and the 8 contact of units selector switch 22 under control of the tens and units control relays 23 and 24, respectively. At the same time, the tens control relay 23 transmits 4 tens voltage pulses on lead T of spare pair 30 while the units control relay 24 transmits 8 units voltage pulses on lead U of spare pair 30, in a manner that is well known in the art and will be further mentioned hereinafter. These 4 tens and 8 units-pulses as transmitted represent the 48 multidigital number identifying the 48-pair on the central office MDF as aforestated.

At the far end of cable 10, the 4 tens and 8 units-pulses energize the tens and units relays 40 and 41, respectively, which in turn step the associated tens selector switch 42 from its normal rest position to its 4 contact and the associated units selector switch 43 from its rest position to the 8-contact. Voltage now effective on the 4 contact of the tens selector switch 42 serves to illuminate both the gas and the 4 digit of the digital gas tube 44, and voltage now effective on the 8 contact of the units selector switch 43 serves to illuminate both the gas and the 8 digit of the digital gas tube 45. Thus, the illumination of the 4 and 8 digits serves to indicate visually at the far end of cable 10 that the 48-pair selected at random thereat, as assumed, should be identified with the 48 multidigital number. As a consequence, the 4 tens and 8 units-digits of the 48 multidigital number displayed visually at the far end of cable 10 are identical with the 4 tens and 8 units-digits of the 48 multidigital number identifying the near end of the 48-pair on the central office MDF section 13. Hence, both the near and far ends of the 48-pair are now identified with the same 48 multidigital number.

The circuit of FIG. 1 may be restored to normal by detaching wire clip 54 from the ring conductor of pair 48 thereby removing the 200-c.p.s. tone therefrom. At this point, it will be understood that when initially the wire clip 54 was attached to the ring conductor of the 48-pair for stepping the tens and units selector switches 21 and 22 at the central office and the tens and units selector switches 42 and 43 at the far cable end, a circuit was prepared to effect the ultimate operation of relay 55 which, when operated, would aid in the restoration of the central office and field sets to normal. Now, when the 200-c.p.s. tone is removed from the ring conductor of the 48-pair at the field end of cable 10, the operated 4 tens and 8 units-relays 19 and 20 are released whereupon relay 55 is operated to aid the central office and field test sets to return to normal and await the random selection of the next conductor pair at the far end of cable 10 for numerical identification, in accordance with the procedure just explained. This operation of relay 55 will be further described hereinafter in connection with FIGS. 2 and 3.

In a similar manner, each pair selected at random at the far end of cable 10 may be numerically identified thereat with the identical multidigital number identifying the near central office end of the same pair. This procedure will be discussed in greater detail hereinafter.

Now, further assuming it is required to identify numerically the far ends of the respective 100 pairs of a nonactive cable 60 with the same or related multidigital numbers identifying the central office MDF ends of the same pairs, this may be accomplished in the following manner. For this purpose, it will be understood that the central office and field test sets 11 and 12, respectively, have not been returned to normal and that the 4 and 8 digits of the digital tubes 44 and 45, respectively, are still illuminated. Also, it will be further understood that the central office ends of the respective 100 conductor pairs of cable 60 terminate at the upper section 68 of the central office MDF on 100 terminal pairs which are connectable one at a time to tone source 34 via the circuit previously traced. Thus, the central office ends of corresponding conductor pairs in both cables 10 and 60 may be identified thereat with the same or related multidigital numbers in a manner that will be presently explained.

It will be additionally understood that switch 35 is operated to its closed position to apply from source 34 a test tone having a preselected frequency say, for example, of 500-c.p.s. via a circuit including certain closed contacts, not shown, of the operated 4 tens and 8 units-relays, leads 61 and 62, cable 66, connector shoe 67, and a particular ring terminal on MDF section 68. This terminal, assumed for the purpose of this explanation, will be ring terminal 48. As a consequence, the 500-c.p.s. tone will now be available on the ring conductor of the 48-pair at the field end of cable 60. As in the case of cable 10, the ring conductors of the respective pairs in cable 60 are readily identifiable by distinctive insulation coloring or code markings whereas the insulation on other conductors of the same pairs is a plain or a noncolor type.

At the field end of cable 60, equipment available for isolating the particular conductor pair transmitting the 500-c.p.s. tone comprises a capacitive probe 63, amplifier 64, and headset 65, as disclosed, for example, in Fisher et al. Patent No. 2,133,384, issued October 18, 1938. For this purpose, the probe is disposed in the area of and caused to engage the insulation on the ring conductors of several pairs until the one ring conductor providing the maximum signal in the headset is reached. As this tone will be found only on the ring conductor of the 48-pair with maximum intensity, as assumed, this pair is then marked with the 48 multidigital number which is still illuminated on the digital tubes 44 and 45. In a similar manner, each of the remaining pairs of the cable 60 is thusly identified at the field end with a multidigital number which is the same as or related to the one identifying the field end of the corresponding pair in cable 10, as hereinafter explained.

When cable 60 is contemplated as a substitute for cable 10, then the far ends of the respective pairs of two cables may be identified with the same multidigital numbers. On the other hand, when cable 60 is intended for incorporation into an overall telephone system, which will also include cable 10, then the far ends of the respective pairs of cable 60 are identified with multidigital numbers whose last two digits are identical with the last two digits of the multidigital numbers identifying the far ends of the corresponding pairs in cable 10. But now, the one or two digits preceding the last two digits of the multidigital numbers assigned to cable 60 will be different, depending upon the number of groups of 100 pairs included in a composite cable including not only the 100-pair groups represented by cables 10 and 60, but in addition several further groups up to and including, for example, 24 100-pair groups. When cable 60 is to be substituted for cable 10, then the near and far ends of the respective pairs of both cables would be identified with the same multidigital numbers whose last two digits are the same as displayed on tubes 44 and 45 say, for example, 01 through 00, depending upon what multidigital numbers were initially assigned to the respective pairs of cable 10. It will be obvious that a "1" is added to pair 00 to identify it as pair 100. When, however, cable 60 is intended for incorporation into a telephone system which will also include cable 10, then the last two digits of the multidigital numbers identifying both the near and far ends of the respective pairs of cable 60 will be the same as the last two digits of the multidigital number identifying the corresponding pairs of cable 10, that is, 01 through 00, but now the one or two digits preceding the last two digits will be different. For example, if the near and far ends of the pairs of cable 10 are identified with the discrete multidigital numbers 01 through 100 as aforenoted, then the near and far ends of the corresponding pairs of cable 60 will include the last digits in the range of 01 through 00 but a third digit preceding such two digits may be a digit in the range of 2 through 9, or a third and a fourth digit may be in the range of 10 through 24. This enables the identification of each conductor pair in a cable having 24 100-pair groups with a multidigital number in the range of 01 through 2400 whereby corresponding pairs in discrete 100-pair groups will be identified with multidigital numbers whose last two digits fall in the range of 01 through 00 and are thereby related in that respect, but whose digits preceding such two digits may be 1 through 24 for identifying the respective 100-pair groups. Obviously, the respective conductor pairs of cables having a quantity of 100-pair groups in excess of 24 may be identified in a similar manner. Each 100-pair group in a multi-group cable is readily identifiable by an appropriate color code so that only the final two digits of each multidigital number have identification significance for the pairs in the respective groups.

Referring now to FIGS. 2, 3 and 4, it will be readily seen that the block diagram of FIG. 1 is shown therein with more detailed circuitry. In the following description, therefore, the same components appearing in several figures are identified with the same reference numerals. Thus, the ring conductor of each of the 01 through 100 pairs of the active cable is connected from the central office MDF section 13 through a lead 13*c* and filter 8 to the input cathodes of rectifiers 15 and 16. The output or anode of each rectifier 15 is connected through amplifier 17 to the operating winding of one of the tens relays, that is, to the operating winding of the 4 tens-relay in the assumed example; whereas the output or anode of each amplifier 18 is connected to the operating winding of one of the units relays, that is, to the operating winding of the 8 units-relay in the assumed example. The connections of the respective 01 through 100 pairs of the cable 10 to the individual tens and units relays may be clearly seen by referring to the chart shown in FIG. 4 which includes an illustration of pair 48, as well as illustrations of the 25, 72, 99 and 00 (or 100) pairs as additional examples. The circuits of FIGS. 2 and 3 are shown in the drawing in their normal or unoperated condition.

In the operation of FIGS. 2 and 3, as in the manner aforedescribed relative to FIG. 1, the switch 33 is initially closed to place the 200-c.p.s. tone on the C and R leads of spare pair 31 at the central office set. At the field set, clip 54 applied to the ring conductor of the assumed 48-pair serves to transmit the 200-c.p.s. tone thereon back to the ring terminal of that pair at the central office MDF section 13. This tone transmitted via connector shoe 13*a* and lead 13*c* is applied through filter 8 and divided at rectifiers 15 and 16 into the two components. A first component amplified in amplifier 17 is applied through the operating winding of the T4 tens relay to negative battery 70*a* while the second component amplified in amplifier 18 is applied through the operating winding of the U8 units relay to negative battery 90*a*, whereupon the two relays are simultaneously operated.

When the T4 tens relay is operated, it places a battery in a circuit including voltage source 70, lead 71, closed T4 relay contact 72, lead 73, normally closed off-normal contact ON of tens selector switch 21, lead 74*a*, normally closed contact 74 and operating winding of tens control relay 23, and ground 75 whereupon the tens control relay 23 is operated for the first time. This relay then closes its contact 76 to energize the tens rotary magnet 77 which causes arm 78 of the tens selector switch 21 to step from its off-normal contact ON to its 1 contact, and at the same time to close its associated contact 79 in circuit with tens release magnet 79*a* for a purpose that will be mentioned later herein. This contact will remain closed until the central office set is restored to its normal condition in a manner that will be subsequently explained. The opening of the off-normal contact ON interrupts the operating circuit for the tens control relay 23 which is thereby released to the unoperated condition to interrupt the operating winding of the rotary magnet 77 for the tens selector switch 21. During this operation and restoration of the tens control relay 23, its normally opened contact 80 was alternately closed and opened to apply a first voltage pulse from battery 81 to the tens conductor T of spare pair 30 for a purpose that will be later mentioned.

On its 1 contact, arm 78 of tens selector switch 21 will find a voltage in a circuit including lead 84, normally closed contact 85 of unoperated tens relay T1, lead 73, closed contact 72 of operated tens relay T4, lead 71 and source 70. This voltage applied via switch arm 78 and normally closed contact 74 to the operating winding of tens control relay 23 effects the second operation thereof. Again, this relay through its closed contact 76 serves to energize rotary magnet 77 which steps switch arm 78 from the 1 contact to the 2 contact, and at the same time through its closed contact 80 serves to apply a voltage pulse from battery 81 to the tens conductor T of spare pair 30. In stepping from the 1 contact to the 2 contact, switch arm 78 interrupted the operating winding for tens control relay 23 whereupon the latter returned to normal for terminating the voltage pulse from battery 81. Thus, a second voltage pulse was transmitted on the tens conductor T of the spare pair 30 as switch arm 78 moved from the 1 contact to the 2 contact of selector switch 21.

In a similar manner, arm 78 is stepped from the 2 contact through the 3 contact and the 4 contact of tens selector switch 21 whereby a third and a fourth voltage pulse were applied to the tens conductor T of spare pair 30. When, however, arm 78 reached the 4 contact of tens selector switch 21, it fails to find a voltage on this contact, as the circuit including battery 70 is interrupted at the open contact 86 of operated tens relay T4. This terminates the stepping of tens selector switch 21 which up to this time had served to effect the application of four voltage pulses in succession from battery 81 to the tens conductor T of spare pair 30 for representing the 4 tens digit of the 48 multidigital number identifying the assumed 48-pair, which was randomly selected at the field or far end of active cable 10.

In a manner similar to that afore-described for the operation of tens selector switch 21 and tens control relay 23 for applying four voltage pulses in succession from battery 81 to the tens conductor T of spare pair 30 in response to the operation of 4 tens relay T4, the operation of the 8 units relay U8 in response to the 200-c.p.s. component in the output of amplifier 18 serves to activate intermittently units control relay 88 and thereby units rotary magnet 83 for moving arm 89 from the off-normal contact ON to its 1 contact to close its associated contact 82 which remains closed in circuit with units release magnet 82*a* for a purpose that will be mentioned later herein. Thereafter, the units rotary magnet 83 serves to step arm 89 from the 1 contact through the 8 contact of the units stepping switch 22. For this purpose switch arm 89 will find voltage from battery 90 effective on the 1 contact through the 7 contact of stepping switch 22 via closed contacts of unoperated units relays U1 through U7 in parallel but no voltage at the 8 contact thereof due to an open contact of operated units relay U8. As a consequence, the units control relay 88 will step switch arm 89 from the 1 contact through the 8 contact of stepping switch 22 but will terminate such stepping at the 8 contact. This will serve to apply 8 voltage pulses in succession from battery 91 to the units conductor U of spare pair 30 for representing the 8 units-digit of the 48 multidigital number identifying the assumed 48-pair at the central office MDF end of active cable 10. This pair, for the purpose of this explanation as hereinbefore mentioned, was assumed to have been selected at random for numeral identification at the field end of active cable 10.

It will be understood that the operation of the tens and units control relays 23 and 88 serves to step the tens and units selector switches 21 and 22, respectively, for transmitting one or more discrete voltage pulses is well known in the telephone art.

At the field set shown in FIG. 3, the 4 tens voltage pulses effective, one at a time, on the tens conductor T of spare pair 30 and the 8 units voltage pulses effective, one at a time, on the units conductor U of the same spare pair are applied to the operating windings of the tens and units control relays 40 and 41, respectively, and via leads 94*a*, 94 and C of pair 31 to find positive battery 27. These pulses will operate both relays 40 and 41 which thereupon close their normally opened contacts 96 and 97, respectively. Closure of tens control relay contact 96 in response to the first of the 4 tens voltage pulses activating tens control relay 40 serves to apply a voltage pulse from battery 109 to rotary magnet 98 which thereupon activates the tens selector switch 42 to move off its associated tens off-normal contact ON and at the same time to step switch arm 101 to the 1 contact. Closure of the tens off-normal contact ON will also serve to close associated contacts 102 and 103 to the operating winding of release relay 55 and to the operating path of tens release magnet 142 for a purpose that will later appear.

In a similar manner, each of the next-succeeding three tens voltage pulses received on tens conductor T of spare pair 30 will operate tens control relay 40 which will then step switch arm 101 from the 1 contact through the 4 contact on tens selector switch 42. As no more tens-pulses will be received, switch arm 101 will remain permanently on the 4 contact of tens selector switch 42. A positive voltage from battery 104 applied via resistor 105 will permanently energize common anode 106 of a tens multidigital gaseous discharge tube 44. A circuit for rendering this positive voltage effective is completed through switch arm 101, lead 108, battery 109, lead 110, battery 111, and lead 112 to the negative terminal of battery 104. Due to the permanent engagement of switch arm 101 with the 4 contact of tens selector switch 42, the gas in the 4 digit of digital tube 44 will be thereby caused to glow permanently in the well-known manner. This will serve to represent the 4 tens-digit of the 48 multidigital number identifying the 48-pair at the central office MDF section 13 as was initially assumed, and at the same time provide the 4 tens digit of the 48 multidigital number for identifying the 48-pair at the field end of cable 10.

In a similar manner each of the eight units voltage pulses received on the units conductor U of spare pair 30 will operate units control relay 41 eight times in succession. At each of such times, rotary magnet 115 will be activated via battery 111 to move arm 116 of units selector switch 43 off its off-normal contact ON to its 1 contact thereby closing contacts 117 and 118 associated therewith and at the same time to step arm 116 from the 1 contact through the 8 contact of the units selector switch 43. Closure of contact 117 in series with units release magnet 144 and of contact 118 in series with the operating path of release relay 55 is for a purpose that will be mentioned later herein. As no more units voltage pulses will be received, arm 116 will remain permanently on the 8 contact. A positive voltage from battery 104 applied through resistor 119 will permanently energize common anode 120 of a units multidigital gaseous discharge tube 45. A circuit for rendering this voltage effective may be traced from switch arm 116, lead 122, battery 109, lead 110, battery 111, and lead 112 to the negative terminal of battery 104. Due to the permanent engagement of arm 116 with the 8 contact of units selector switch 43, the gas in the 8 digit of multidigital tube 45 will be thereby caused to glow permanently in the familiar manner. This will serve to represent the 8 units digit of the 48 multidigital number identifying the 48-pair at the central office MDF as was initially assumed, and at the same time provide the 8 units digit of the 48 multidigital number for identifying the 48-pair at the field or far end of cable 10.

It will be again understood that the operation of the tens and units control relays 40 and 41 to step the tens and units selector switches 42 and 43, respectively, for energizing discrete digits of the multidigital tubes 44 and 45 in the manner aforesaid is well known in the telephone art.

Referring again to the numerical identification of the respective conductor pairs in a second multipair cable 60 at ends far from near ends at which the last-mentioned pairs are numerically identified with the same or related multidigital numbers identifying the corresponding pairs at the near ends of cable 10 as aforedescribed in regard to FIG. 1 and to the corresponding circuitry in FIGS. 2 and 3, it will be understood in FIGS. 2 and 3 that switch 35 is operated to the closed position for rendering effective the 500-c.p.s. tone from source 34. This tone will be transmitted via leads 122 and 123, closed contacts 124 and 125 of operated tens and units relays T4 and U8, respectively, leads 61 and 62 of cable 66, and connector shoe 67 to ring terminal R of pair 48 on MDF section 68. From this ring terminal, the 500-c.p.s. tone is transmitted to the field end of the ring conductor included in pair 48 in cable 60. This pair shown in cable 60 in FIGS. 2 and 3 is identified at the field end thereof via audible equipment 63, 64, and 65 in the manner hereinbefore explained in regard to FIG. 1.

After pair 48 has been numerically identified in cable 10 alone, or in addition as the corresponding pair in cable 60, in the manner previously explained, the technician prepares to identify the next-succeeding randomly selected pair in cable 10, or in addition the corresponding pair in cable 60, by initially detaching wire clip 54 from the ring conductor of the 48-pair shown in FIGS. 1, 2 and 3 whereby the 200-c.p.s. tone is removed therefrom. As a consequence, operated tens and units relays T4 and U8, respectively, in FIG. 2 will immediately release to the unoperated condition. This will complete operating paths for the tens and units release magnets 79*a* and 82*a*, respectively, in FIG. 2 in the following circuits: for release magnet 79*a* via a circuit including ground 75, tens release magnet 79*a*, closed contact 79, leads 130 and 131, closed contacts of released tens relays T1 through T0 in series, lead 132, closed contacts of released units relays U1 through U0 in series, and battery 90; and for release magnet 82*a* in a circuit including ground 82*b*, units release magnet 82*a*, closed contact 82, leads 133 and 131, closed contacts of released tens relays T1 through T0 in series, lead 132, closed contacts of released units relays U1 through U0 in series, and battery 90. The activated release magnets 79a and 82a serve to restore the tens and units selector switches 21 and 22, respectively, to the off-normal or rest positions whereupon the associated contacts 79 and 82 are now opened to interrupt the aforetraced operating paths for the respective tens and units release magnets. These paths remain interrupted until the next conductor pair is randomly selected at the field end of cable 10 for a similarly numerical identification.

At the same time, the release of the tens relay T4 and units relay U8 serve to apply voltage from battery 90 in FIG. 2 to the operating winding of release relay 55 in FIG. 3 in a circuit including: in FIG. 2—battery 90, closed contacts of released units relays U0 through U1 in series, lead 132, closed contacts of released relays T0 through T1 in series, lead 131, conductor R of spare pair 31; and in FIG. 3—conductor R of spare pair 31, lead 135, operating winding of release relay 55, lead 136, closed contact 102, leads 137 and 94, conductor C of spare pair 31 in both FIGS. 2 and 3 to positive battery terminal 27 connected to the latter conductor as shown in FIG. 2. This causes release relay 55 to operate and thereupon to close contacts 140 and 141 associated therewith.

Closure of contact 140 completes an operating path for tens release magnet 142 in a circuit further including closed contact 103, lead 108, battery 109, lead 143 and closed relay contact 141 back to closed relay contact 140. At the same time closure of relay contact 141 completes an operating path for units release magnet 144 in a circuit further comprising lead 145, closed contact 117, lead 146, battery 111, and leads 110 and 143 back to closed contact 141. The energized release magnets 142 and 144 serve to restore the tens and units selector switches 42 and 43, respectively, to the off-normal condition whereupon the contacts 102 and 103 and 117 and 118 associated therewith are opened to interrupt the aforetraced operating paths for the respective tens and units release magnets. As a consequence, switch arms 101 and 116 are returned to their rest positions. These paths remain interrupted until the next conductor pair is randomly selected at the field end of cable 10 for a similarly numerical identification.

The remaining 01 through 47 and 49 through 100 (or 00) conductor pairs in cable 10 and the corresponding conductor pairs in cable 60 may be numerically identified with multidigital numbers at the far ends thereof in accordance with the last-mentioned procedure described relative to such identification of the pair 48, as well as in accordance with the procedure relative to the identification of the conductor pairs described above in regard to FIG. 1.

It is to be further understood that the above described embodiments are merely illustrative of the application of the principles of the invention. Numerous other arrangements may be devised by those skilled in the art without departing from the spirit and scope of the invention.

What is claimed is:

1. Apparatus for numerically identifying the respective conductor pairs in a multipair conductor cable with discrete multidigital numbers at ends far from near ends at which the same pairs are identified with discrete multidigital numbers, comprising signal tone generator means at the far end of said multipair cable, means to apply said signal tone to a preselected conductor of said multipair cable, means for translating said signal tone of preselected frequency transmitted on one conductor of each pair selected one at a time at random at the far cable end into associated quantities of tens and units pulses having numerical values representing the numerical values of the tens and units digits, respectively, of the discrete multidigital numbers identifying such pairs at the near cable end, means to transmit said tens and units pulses to said far end of said multipair cable, and means to utilize the associated quantities of tens and units pulses for producing at the far cable end other discrete multidigital numbers having tens and units digits identical with the tens and units digits of the respective discrete multidigital numbers identifying the corresponding pairs at the near cable end thereby numerically identifying the respective pairs selected at random at the far cable end with said other discrete multidigital numbers.

2. The apparatus according to claim 1 in which said utilizing means includes means to utilize the associated quantities of tens and units pulses for producing visual displays of the respective other discrete multidigital numbers at the far cable end.

3. The apparatus according to claim 1 in which said utilizing means includes means to utilize the associated quantities of tens and units pulses for producing visual displays of the respective other discrete multidigital numbers at the far cable end in such manner that the associated quantities of tens and units pulses produce simultaneous tens and units digits, respectively, in the last-mentioned numbers.

4. The apparatus according to claim 1 in which said utilizing means includes a first means to utilize the quantities of tens pulses for producing at the far cable end the tens digits of the respective other multidigital numbers, and a second means to utilize the quantities of units pulses for producing at the far cable end the units digits of the respective other multidigital numbers.

5. The apparatus according to claim 4 in which said first means utilizes the quantities of tens pulses produces at the far cable end visual displays of the tens digits of the respective other multidigital numbers, and said second means responsive to the quantities of units pulses produces at the far cable end visual displays of the units digits of the respective other multidigital numbers, said visual displays of the tens and units digits of the respective other discrete multidigital numbers being simultaneous.

6. The apparatus according to claim 1 in which said translating means comprises means for dividing the signal tone transmitted on the one conductor of each pair at the near cable end into two components which are translated into the associated quantities of tens and units pulses having numerical values representing the numerical values of the tens and units, respectively, of the discrete multidigital numbers identifying the respective pairs at the near cable end.

7. The apparatus according to claim 6 in which said translating means includes a first means for translating one of said two components into the associated quantities of tens pulses and a second means for translating the other of said two components into the associated quantities of units pulses.

8. The apparatus according to claim 1 which includes a plurality of filter networks, each effectively connected to said one conductor of each of said pairs for transmitting said preselected signal tone to said translating means but effectively blocking signal tones having frequencies different from the preselected frequency and transmitted on the one conductor of the respective conductor pairs.

9. The apparatus according to claim 1 for numerically identifying the respective conductor pairs of individually insulated conductors in a second multipair conductor cable with discrete multidigital numbers at ends far from near ends at which the last-mentioned respective pairs are numerically identified with the same multidigital numbers identifying the corresponding pairs at the near ends of the first-mentioned cable, which includes means for transmitting a second signal tone of a preselected frequency different from the preselected frequency of said first-mentioned tone on the predetermined conductors, one at a time, of the respective conductor pairs of said second cable simultaneously with the translation of the first-mentioned signal tone into the associated quantities of tens and units pulses, and means to detect said second tone on a maximum intensity basis at the far ends of the predetermined conductors of the respective pairs of said second cable for numerically identifying said last-mentioned respective pairs at their far ends with multidigital numbers which are the same as or related to the other multidigital numbers identifying the far ends of the corresponding pairs of said first-mentioned cable.

10. The apparatus according to claim 9 in which said detecting means comprises capacitive means to engage the insulation on the far ends of the respective pairs of said second cable for capacitively picking up therefrom said second tone being transmitted on the predetermined conductors, one at a time, of the respective conductor pairs, and means to translate said second tone so capacitively picked up into indications of maximum intensity for numerically identifying the far ends of the respective pairs of said second cable with discrete multidigital numbers which are the same as the discrete other multidigital numbers identifying the far ends of the corresponding pairs of the first cable.

11. The apparatus according to claim 1 which includes means responsive to the transmission of said signal tone on the one conductor of the respective conductor pairs and thereafter to the removal of said signal tone from such one conductor for restoring said translating means and utilizing means to normal conditions after producing said other multidigital numbers for numerically identifying the respective conductor pairs at said far cable end.

12. Apparatus for identifying any one pair selected at random out of a plurality of conductor pairs included in a multipair cable at an end far from a near end at which the respective pairs in the cable are identified with multidigital numbers, comprising means for supplying a signal tone of predetermined frequency to a preselected conductor of said one pair at said far cable end, means for dividing said tone into two components as received on said preselected conductor at said near cable end, means for translating said two components at said near cable end into quantities of tens and units pulses having numerical values representing the numerical values of the tens and units digits, respectively, of the multidigial number identifying said one pair at said near cable end, means for transmitting said tens and units pulses to said far cable end, and means for utilizing the tens and units pulses as received on said transmitting means at said far cable end to produce another multidigital number having tens and units digits which are the same as the tens and units digits of the multidigital number identifying said one pair at the near cable end whereby said one pair is numerically identified at said far cable end with said other multidigital number.

13. The apparatus according to claim 12 in which said utilizing means comprises means for utilizing said tens and units pulses as received on said transmitting means at said far cable end to produce said other number in a visual display in such manner that the tens and units digits of said last-mentioned other number are simultaneously visually displayed.

14. Apparatus for numerically identifying the respective conductor pairs in a multipair conductor cable at ends far from near ends at which the same pairs are identified with discrete multidigital numbers, each of said pairs including a conductor of distinctive characteristic, comprising means for detachably connecting a source of signal tone of preselected frequency to the distinctive conductors at the far ends of the respective pairs selected at random one at a time, means for dividing the discrete tones received on the distinctive conductors of the respective pairs one at a time at the near cable end into two associated components, means for translating the two components of discrete tones into groups of associated quantities of tens and units pulses in such manner that the tens and units pulses in each group have numerical values representing the numerical values of the tens and units digits, respectively, of the multidigital numbers identifying the respective pairs at the near cable end, means for transmitting said groups of associated quantities of tens and units pulses to the far cable end, and means for utilizing the respective groups of associated quantities of tens and units pulses received on said transmitting means at the far cable end to produce discrete other multidigital numbers, each having tens and units digits corresponding with the tens and units digits, respectively, of the discrete multidigital numbers identifying the same pairs at the near cable end, for numerically identifying the respective pairs selected at random at the far cable end with said last-mentioned other numbers.

15. The apparatus according to claim 14 which includes means responsive to the connection of said tone source to the respective distinctive conductors and the disconnection of said tone source therefrom for restoring said translating and utilizing means to normal conditions after each conductor pair is numerically identified with one of said other multidigital numbers at said far cable end.

16. The apparatus according to claim 14 in which said dividing means comprises a plurality of pairs of unidirectional conduction devices of which each pair has corresponding first terminals connected to the distinctive conductor of the one conductor pair of the respective conductor pairs at said near cable end.

17. The apparatus according to claim 16 in which said translating means includes two groups of electromagnetic relays, each group containing ten relays, each relay of each group representing one digit in a range 0 through 9, one of said relay groups having its operating windings connected to second terminals of one device of the respective pairs of unidirectional conduction devices and thereby characterized as the tens relay group and the other of said relay groups having its operating windings connected to second terminals of the other device of the respective pairs of unidirectional conduction devices and thereby characterized as the units relay group, one relay in each of said relay groups being operated in response to one of said components effective on said second terminals of one pair of unidirectional conduction devices connected thereto at a given time whereby individual relays of the respective tens and units relay groups serve to represent corresponding individual tens and units digits, respectively, of the discrete multidigital numbers identifying the respective conductors pairs at said near cable end.

18. The apparatus according to claim 17 in which said translating means also includes first stepping means responsive to the operated condition of the respective relays in said tens relay group for transmitting on a first spare conductor included in said cable a quantity of pulses having a numerical value representing the numerical value of the tens digits of the discrete multidigital numbers identifying the respective conductor pairs at the near cable end, and second stepping means responsive to the operated condition of the respective relays in said units relay group for transmitting on a second spare conductor included in said cable a quantity of pulses having a numerical value representing numerical value of the units digits in the discrete other multidigital numbers identifying the respective conductor pairs at the near cable end.

19. The apparatus according to claim 18 in which said pulse utilizing means comprises first and second control relays, said first control relay having the operating winding connected to said first spare conductor for activation by the quantity of said tens pulses transmitted thereon, and said second control relays having the operating winding connected to said second spare conductor for activation by the quantity of said units pulses transmitted thereon, a third stepping means including a conductive arm movable over a plurality of discrete contacts in the 0 through 9 range in response to the quantity of tens pulses received on said first spare conductor at said far cable end, and a fourth stepping means including a conductive arm movable over a plurality of discrete contacts in the range 0 through 9 in response to the quantity of tens pulses received on said second spare conductor at said one cable end, whereby said third and fourth stepping means have their movable arms actuated to and stopped on particular contacts thereof for representing the numerical values of the tens and units digits, respectively, of the discrete multidigital numbers identifying the respective conductor pairs at the near cable end.

20. The apparatus according to claim 19 in which said pulse utilizing means also includes first and second visual display means each including a plurality of discrete gas-filled digits in the range 0 through 9, and a common source of voltage for activating the gas in each of said digits, said activating source being connectable to said first display means by said arm and one contact of said third stepping means and to said second display means by said arm and one of said contacts of said fourth stepping means, said activating source being normally disconnected from said first and second display means so that said digits thereof are normally in a nonilluminated condition, and individual digits of said first and second display means being simultaneously illuminated by the voltage of said source in response to the stopping of said movable arms on particular contacts of said third and fourth stepping means for indicating the tens and units digits, respectively, of the discrete other multidigital numbers identifying the respective pairs selected at random at the far cable end in correspondence with the tens and units digits of the discrete multidigital numbers identifying the same pairs at the near end of said cable.

21. The apparatus according to claim 20 for numerically identifying in a visual manner the respective conductor pairs in a second multipair conductor cable at ends far from near ends at which the last-mentioned respective pairs are numerically identified with the multidigital numbers identifying the near ends of the corresponding pairs of the first-mentioned cable, which includes means for applying a second signal tone of a preselected frequency which is different from the first-mentioned preselected frequency to a predetermined conductor of the respective conductor pairs of said second cable simultaneously with the operation of the respective relays in said tens and units relay groups, and means to observe the maximum intensity of said second tone on the predetermined conductors of the respective pairs of said second cable at the far end thereof for numerically identifying said respective last-mentioned pairs thereat with multidigital numbers which are the same as or related to the discrete other multidigital numbers visually displayed by said first and second display means for identifying the far ends of the corresponding pairs of said first cable.

22. The apparatus accordiing to claim 16 which includes a plurality of filter networks, each including a plurality of reactive elements, one of said elements connected to said distinctive conductor in series with said first terminals of one pair of said unidirectional conduction devices and another of said elements connected between ground and a further terminal common to said last-mentioned one element and first terminals, said filter networks transmitting said preselected tone to said first terminals of said plurality of pairs of unidirectional conduction devices but effectively blocking therefrom all other signal tones having frequencies different from said preselected frequency and transmitted on the distinctive conductors of the respective conductor pairs.

23. Apparatus for numerically identifying in a visual manner the respective conductor pairs in a multipair conductor cable at ends far from near ends at which the same pairs are identified with discrete multidigital numbers comprising means for detachably connecting a source of signal tone of preselected frequency to the far ends of predetermined conductors of the respective pairs one at a time selected at random, means for dividing each of the discrete tones received on the predetermined conductors of the respective pairs one at a time at the near cable end into two components, units relay means at the near cable end for activation by one of said components, said units relay means comprising a plurality of relays each representing one digit in the range 0 through 9 whereby respectively particular relays of said units relays are activated to the operated condition for representing individual units digits of the discrete multidigital numbers identifying the near ends of the respective pairs, tens relay means at the near cable end for activation by the other of said components, said tens relay means comprising a plurality of relays each representing one digit in the range 0 through 9 whereby respectively particular relays of said tens relays are activated to the operated condition for representing individual tens digits of the discrete multidigital numbers identifying the near ends of the respective pairs, a first stepping means responsive to the operated condition of the respective units relays of said near cable end for transmitting on a first spare conductor included in said cable quantities of pulses having numerical values representing the numerical values of the units digits of the discrete multidigital numbers identifying the respective conductor pairs at the near cable end, a second stepping means responsive to the operated condition of the respective tens relays at the near cable end for transmitting on a second spare conductor included in said cable quantities of pulses having numerical values representing the numerical values of the tens digits of the discrete multidigital numbers identifying the respective conductor pairs at the near cable end, a units control relay connected to said first spare conductor at the far cable end for operating a number of times equal to the numerical value of the quantity of units pulses received from said last-mentioned conductor, a tens control relay means connected to said second spare conductor at the far cable end for operating a number of times equal to the numerical value of the quantity of tens pulses received from said last-mentioned conductor, first and second visual display means, each including a plurality of discrete gas-filled digits in the range of 0 through 9, a supply of voltage connectable to the respective digits of both said first and second display means for controlling the illumination thereof and being normally disconnected from said last-mentioned means whereby the associated digits are normally nonilluminated, a third stepping means including a plurality of contacts in the 0 through 9 range and responsive to the number of operations of said units control relay to step to a correspondingly numbered one of said contacts for connecting said voltage supply via said last-mentioned contact to said first display means thereby illuminating the gas in predetermined individual digits thereof, said illuminated units digits representing the units digits at the far cable end in correspondence with the respective units digits of the discrete multidigital numbers identifying the near ends of the respective conductor pairs, and a fourth stepping means including a plurality of contacts in the 0 through 9 range and responsive to the number of consecutive operations of said tens control relay to step to a correspondingly numbered one of said contacts for connecting said voltage supply to said second display means thereby illuminating the gas in predetermined individual digits thereof, said illuminated tens digits representing the tens digits at the far cable end in correspondence with the respective tens digits of the discrete multidigital numbers identifying the near ends of the respective conductor pairs, said last-mentioned illuminated units and tens digits providing at the far cable end visual indications of discrete other multidigital numbers identifying the respective conductor pairs thereat in correspondence with the units and tens digits of the discrete multidigital numbers identifying the respective same pairs at the near cable end for numerically identifying the respective conductor pairs at the far cable end with the discrete other multidigital numbers.

24. The apparatus according to claim 23 which includes means responsive to the connection of said tone source to the predetermined conductors at the far cable end and thereafter the disconnection of said tone source therefrom for restoring to normal at said near cable end said units and tens relay means and said first and second stepping means and at said far cable end said units and tens control relays, said third and fourth stepping means, and said first and second display means at said far cable end after the disconnection of said signal source from each conductor pair which has been numerically identified at the far cable end but before the next-succeeding conductor pair at said far cable end is selected at random for a similarly numerical identification.

25. The apparatus according to claim 23 for numerically identifying the respective conductor pairs in a second multipair conductor cable at ends far from near ends at which the last-mentioned respective pairs are numerically identified with multidigital numbers which are the same as or related to those identifying the corresponding pairs at the near ends of the first-mentioned cable, which includes means for transmitting a second signal tone having a frequency different from said preselected frequency on other predetermined conductors of the respective conductor pairs of said second cable simultaneously with the operation of the respective relays in said units and tens relay means at said near cable end, and means for detecting the maximum intensity of said second signal tone at the far ends of the respective conductor pairs of said second cable, said detecting means comprising a metallic probe cooperating with the insulation on the respective predetermined conductors of the respective pairs for capacitively deriving said second signal tone from said last-mentioned conductors, means for amplifying said second signal tone effective on said probe, and means for observing the maximum intensity of said amplified signal tone, whereby the respective conductor pairs at the far end of said second cable are identified with discrete further multidigital numbers which are the same as the discrete other multidigital numbers illuminated in said first and second visual display means for identifying the far ends of the corresponding pairs of said first cable.

26. The apparatus according to claim 23 which includes a plurality of filter networks, each including at least a capacitor and an inductor, said capacitor of each network connected in series between the distinctive conductor of one conductor pair at the near cable end and said signal dividing means, and said inductor of each network connected between ground and a terminal common to said capacitor and last-mentioned dividing means, said filter networks transmitting said preselected signal tone to said dividing means but effectively blocking signal tones having frequencies different from said preselected frequency and transmitted on the distinctive conductors of the respective conductor pairs.

27. Apparatus for identifying the respective pairs in a multipair conductor cable with discrete multidigital numbers at ends far from near ends at which the same pairs are identified with discrete multidigital numbers comprising means for selecting each conductor pair at random at the far cable end for identification thereat, means at the near cable end responsive to a signal applied to a preselected cable pair at the far cable end to transmit two associated groups of discrete pulses on a common pair therefrom for representing the tens and units digits of the multidigital number identifying the near end of each preselected pair, and means at the far cable end activated by the associated two groups of discrete pulses received on said common pair thereat to produce a visual display of a multidigital number whose tens and units digits correspond with the tens and units digits of the multidigital number identifying the same pair at the near cable end.

28. In a telephone system where it is desired to numerically identify the respective pairs in a multipair cable with discrete multidigital numbers at ends far from near ends at which the same pairs are identified with discrete multidigital numbers, which comprises means for transmitting a signal tone of predetermined frequency over one conductor of each pair selected in succession and at random at the far cable end, means at the near cable end for dividing the received signal tone into two components which are respectively indicative of the tens and units numerical values of the pair over which the signal tone is then being received, means for generating tens and units pulses corresponding to said tens and units numerical values, means for transmitting said tens and units pulses to the far cable end, selector switch means at said far cable end operative in response to said tens and units pulses to produce at the far cable end a multidigital number having tens and units digits identical with the tens and units digits of the respective multidigital numbers identifying the pairs at the near cable end, for numerically identifying respective pairs selected at random at the far cable end with the other multidigital numbers.

References Cited by the Examiner

UNITED STATES PATENTS 2,862,179 11/1958 Murphy ------------ 324—66

WALTER L. CARLSON, *Primary Examiner.*

J. P. O'BRIEN, W. H. BUCKLER, *Assistant Examiners.*